United States Patent [19]

Holt, Jr.

[11] 3,949,048

[45] Apr. 6, 1976

[54] SEPARATION BY SOLVENT EXTRACTION

[75] Inventor: Charles H. Holt, Jr., Kennewick, Wash.

[73] Assignee: The United States of America as represented by the United States Energy Research and Development Administration, Washington, D.C.

[22] Filed: July 24, 1950

[21] Appl. No.: 175,543

[52] U.S. Cl. .......................... 423/8; 423/9; 423/10

[51] Int. Cl.$^2$ .......................... B01D 11/04

[58] Field of Search .......... 226/116; 22/73; 23/14.5, 23/312; 62/124 US; 423/8, 9, 10

[56] References Cited

UNITED STATES PATENTS

| | | | |
|---|---|---|---|
| 925,820 | 6/1909 | Monti | 62/124 |
| 2,227,833 | 1/1941 | Hixson et al. | 423/8 |

FOREIGN PATENTS OR APPLICATIONS

| | | | |
|---|---|---|---|
| 5,084 | 1825 | United Kingdom | 22/73 |
| 815,995 | 4/1937 | France | |

*Primary Examiner*—Benjamin R. Padgett
*Assistant Examiner*—Richard E. Schafer
*Attorney, Agent, or Firm*—Dean E. Carlson; Arthur A. Churm; Lena R. Ziegler

EXEMPLARY CLAIM

17. A process for separating fission product values from uranium and plutonium values contained in an aqueous solution, comprising adding an oxidizing agent to said solution to secure uranium and plutonium in their hexavalent state; contacting said aqueous solution with a substantially water-immiscible organic solvent while agitating and maintaining the temperature at from −1° to −2° C. until the major part of the water present is frozen; continuously separating a solid ice phase as it is formed; separating a remaining aqueous liquid phase containing fission product values and a solvent phase containing plutonium and uranium values from each other; melting at least the last obtained part of said ice phase and adding it to said separated liquid phase; and treating the resulting liquid with a new supply of solvent whereby it is practically depleted of uranium and plutonium.

20 Claims, 1 Drawing Figure

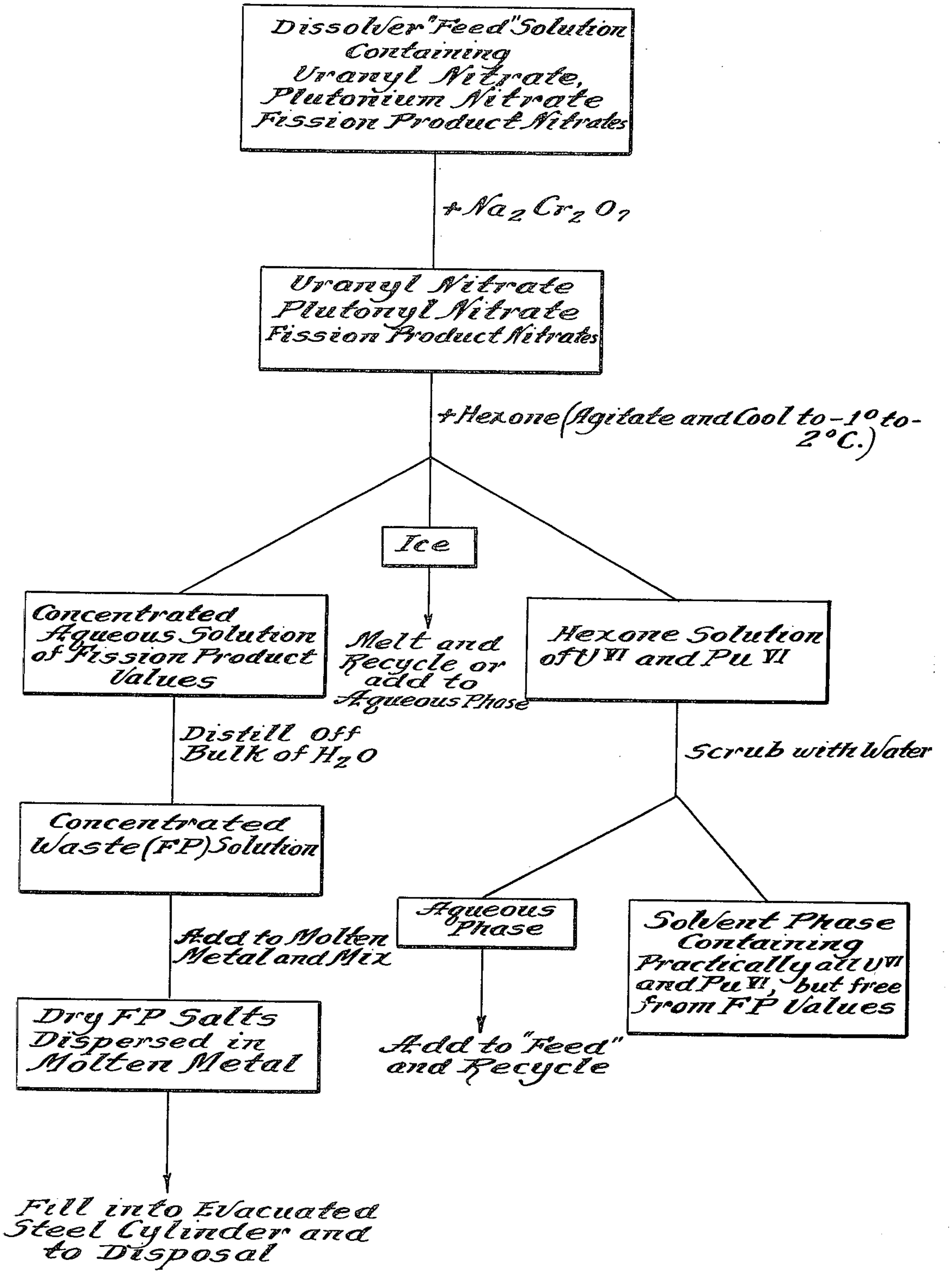
INVENTOR.
Charles H. Holt, Jr.
BY
Roland A. Anderson
Attorney.

SEPARATION BY SOLVENT EXTRACTION

This invention deals with the separation by solvent extraction of water- and solvent-soluble salts, in particular of uranium and/or plutonium, from other water-soluble salts, for instance, rare earth metal salts such as fission product salts.

It is an object of this invention to provide a process for separating salts by solvent extraction from aqueous solutions without the necessity of the use of salting-out agents.

Another object of this invention is to provide a process for separating salts by solvent extraction from aqueous solutions in which the separation of the aqueous phase and the solvent phase and the concentration of the aqueous solution obtained are carried out in the same step almost simultaneously.

Still another object of this invention is to provide a process for selectively extracting salts from mixtures in aqueous solutions by which a high degree of separation is obtained.

It is still another object of this invention to provide a process for the separation of fission product salts from uranium and/or plutonium containing solutions, such as dissolver solutions in which the fission products, when separated, are obtained in a non-bulky and easily manageable form so that disposal of the waste is facilitated.

These and other objects are accomplished by contacting an aqueous solution containing the salts to be separated with a substantially water-immiscible organic solvent while cooling the liquids slightly below 0° C., preferably to from −1° to −2° C., and agitating them whereby solvent-soluble salts are extracted into a solvent extract phase, a fraction of the water present is frozen to a solid phase and preferentially water-soluble salts remain in solution as a liquid aqueous phase, and separating the aqueous phases from the solvent phase.

The ice formed during cooling may be removed continuously; in this case separation can be more easily controlled and freezing and separation of a solid phase discontinued when salts start to appear in said solid phase. The freezing point of the liquid aqueous phase is reduced as it becomes more and more concentrated with regard to the water-soluble salts; this prevents the aqueous solution from freezing at the temperature used. Due to the relatively small volume of the liquid aqueous phase present in the process of this invention, a higher degree of separation is possible, and in particular lesser quantities of solvent-soluble salts remain in the liquid aqueous phase. This effect makes the use of a salting-out agent unnecessary, which, in turn, makes possible the removal of a greater quantity of water in the form of ice and is responsible for a more concentrated and smaller volume of aqueous solution. It will thus be seen that due to a combination of various effects of the conversion of the bulk of water to ice an extremely high efficiency is obtained.

On the attached flow sheet a preferred embodiment of the process of my invention is diagrammatically illustrated. In this case, a dissolver "feed" solution obtained by dissolving a neutron-irradiated uranium slug is used as the starting material; the purpose is to separate and remove the fission product values from the uranium and plutonium values. This application of the process of this invention is given only by way of example without the intention to limit the invention thereto. It will be understood that the invention is applicable equally well to the separation of any salts which are water- and solvent-soluble from those which are only water-soluble.

The dissolver feed solution used in the embodiment illustrated in the flow sheet is an aqueous nitric acid solution of uranyl nitrate, plutonium(IV) nitrate and fission product nitrates. To this solution sodium dichromate is added whereby the plutonium(IV) nitrate is converted to plutonyl nitrate. Thereafter, the solution is contacted with hexone in sufficient quantity to extract all of the uranyl and plutonyl nitrates present, and the two liquids are agitated and cooled to from −1° to −2° C. After a short while three phases form in the container, one solid ice phase which in the beginning consists of pure water but later on may contain a slight quantity of salts of the feed solution. By stopping cooling at the proper moment, the degree of purity of the ice phase may be controlled. The second phase is a relatively concentrated aqueous solution which mainly contains the fission product nitrates. The third phase is a hexone solution containing the bulk of uranyl and plutonyl nitrates.

The phases are then separated. The ice phase may be discarded partially or entirely if it is practically free of any of the salts present. In particular, the fraction of the ice formed in the first stage of the process may be discarded. The later formed fraction of the ice may also be melted and concentrated together with the liquid aqueous phase as will be described later.

The concentrated aqueous phase which remains unfrozen and contains the bulk of the fission product values is made ready for waste disposal. Prior to treatment, part of the melted ice may be admixed thereto as has been mentioned before. For further concentration, the aqueous liquid is subjected to a distillation process whereby the bulk of the water is removed. Thereafter, the highly concentrated waste solution is introduced into a container which contains a molten metal. The solution in contact with this metal loses the remainder of its water and thereby is evaporated to dryness. The molten metal is then thoroughly agitated in order uniformly to distribute therein the dry fission product salts. The vapors distilled off in these two concentration steps may be condensed and added, for recycling, to the liquid aqueous phase obtained after the separation of the three phases.

This mixture is then filled into containers for waste disposal. It has been found that stainless steel cylinders which have been evacuated and sealed with a low melting alloy plug are especially well suitable for this purpose. When these steel cylinders are immersed into the molten metal containing the fission product salts, the plug melts and flows out of the opening, and the molten radioactive metal mixture enters the cylinder until the latter is completely filled. The cylinder may be capped upon removal from the radioactive mass and inserted into a cask; it is then ready for disposal.

The hexone phase separated from the two aqueous phases contains the bulk of the uranyl and plutonyl nitrates. This solution is scrubbed with a small amount of water in order to remove small quantities of fission product salts which might have entered the solvent phase. The aqueous scrub solution thus obtained may be added to the feed solution and recycled, or else it may be added to the liquid aqueous phase for concentration and disposal; for maximum uranium and/or plutonium recovery recycling is preferred. The scrubbed solvent phase which is now practically free of fission product values is then processed for the separation of plutonium from uranium.

For separating the plutonium nitrate from the uranium nitrate in the solvent phase the process of the invention may also be utilized. For this purpose, the solvent extract phase is scrubbed with an aqueous solution containing a salting-out agent and ferrous sulfamate; the latter selectively reduces the plutonyl nitrate to plutonium(III) nitrate. While plutonyl nitrate is solvent-soluble, the plutonium(III) nitrate is only water-soluble. Consequently, the plutonium(III) nitrate formed is back-extracted into said aqueous ferric sulfamate solution, while the uranyl nitrate, due to the presence of a salting-out agent, remains unaffected and in the solvent phase. Alternately, using a ferrous sulfamate solution in the absence of a salting-out agent, the separation of the plutonium from the solvent phase is carried out by the freezing step as described above, whereby an especially high degree of separation is obtained due to the small quantity of liquid aqueous phase.

In the following table, the concentration of the various phases in uranyl nitrate, plutonyl nitrate and fission product nitrates are compiled as obtained after one cycle. The figures given there illustrate the high efficiency of separation by the process of this invention. As has been mentioned before, the separation may be increased by repeating the cycle.

The example illustrated in the table is based on the extraction of 100 gal. of feed solution and 15 gal. of recycled "solution 4" (see below) with 300 gal. of hexone at a temperature of from −1° to −2° C. The liquids are thoroughly agitated during the extraction step. The feed solution is designated "solution 1" in the table. The solvent phase separated from the ice and the liquid aqueous phase corresponds to solution 2 of the table. The solvent phase after being scrubbed with 15 gal. of water is solution 3, and the aqueous scrub solution obtained thereby corresponds to solution 4 of the table. This aqueous scrub solution 4 is returned to the low temperature extractor for removal and recovery, in the next batch, of the uranyl and plutonyl nitrates back-extracted during scrubbing. The aqueous liquid phase from the low temperature extractor comprising the liquid phase and the melted ice is solution 5.

TABLE (Compositions are in pounds per unit batch)

| Solution | Uranyl Nitrate Hexahydrate | Plutonium Nitrate Hexahydrate | Fission Product Nitrates |
|---|---|---|---|
| Solution 1 | 715 | 0.3 | 0.3 |
| Solution 2 | 789 | 0.329 | 0.01 |
| Solution 3 | 714 | 0.229 | Small |
| Solution 4 | 75 | 0.03 | 0.01 |
| Solution 5 | 1 | 0.001 | 0.3 |

It will be seen from the table that the aqueous phase leaving the low temperature extractor contains almost all of the fission product nitrates and is almost free of uranium and plutonium values and that the scrubbed solvent solution (solution 3) has only a low content of fission product values but contains practically all of the uranium and plutonium values.

Any type of aqueous solutions containing solvent-soluble plus water-soluble salts is suitable for the process of this invention. However, it is optional, but unnecessary, to use an acidified solution and in particular one containing mineral acid. The preferred acid is nitric acid.

While all kinds of oxidizing agents known to those skilled in the art are applicable for the oxidation of plutonium to its hexavalent state, dichromate anions have been found especially satisfactory.

There are several types of organic compounds that are satisfactory solvents for the extraction in the process of this invention. These types are ethers, glycol ethers, esters, ketones, alcohols, alkyl phosphates, nitrohydrocarbons, and alkyl sulfides. A common structural property of all of these types of compounds is that they have an atom capable of donating an electron pair to a coordination bond. The extractive solvent is a liquid substantially immiscible with water and aqueous solutions. If it is a solid at room temperature, the extraction is carried out at a temperature above its melting point. The following is a list of compounds that are suitable extractants for the process of this invention:

ethyl ether
isopropyl ether
butoxyethoxyethane (ethyl butyl "Cellosolve")
diethyl ether of ethylene glycol (diethyl "Cellosolve")
dibutyl ether of diethylene glycol (dibutyl "Carbitol")
dibutyl ether of tetraethylene glycol
ethyl acetate
n-propyl acetate
butoxyethoxyethyl acetate (butyl Carbitol acetate)
methyl isobutyl ketone (hexone)
acetophenone
mesityl oxide
cyclohexanone
tert-amyl alcohol
2-ethyl-1-hexanol
tributyl phosphate
trioctyl phosphate
octadecyl dihydrogen phosphate
dioctyl hydrogen phosphate
nitromethane
ethyl sulfide
n-propyl sulfide For evaporating and absorbing the fission product values, all kinds of molten materials of sufficiently high temperature may be used; for instance, molten salts, molten metals and molten alloys, which are used at a temperature above the boiling temperature of water, have been found suitable.

While it has been pointed out above that freezing of the water and its removal as a solid phase has been found particularly advantageous, removal of the water by azeotropic distillation under vacuum has also been found satisfactory.

The process of this invention is not restricted to the examples given, but it is applicable to the separation of all organic solvent-extractable salts from solvent-nonextractable salts. Apart from the use of the invention for processing of neutron-irradiated uranium slugs, it has also been found excellently suitable for the separation of the various ingredients of uranium-containing ores, such as monazite sand, pitchblende and carnotite type ores. Of course, the process is not restricted to batch operation; continuous operation with suitable equipment can be used.

It will also be understood that the invention is not to be restricted to the specific details given herein, but that it may be modified within the spirit of the invention and the scope of the appended claims.

What is claimed is:

1. A process for separating organic solvent-extractable salts from organic solvent-nonextractable salts both contained in an aqueous solution, comprising contacting said aqueous solution with a substantially water-immiscible organic solvent while cooling the liquids slightly below 0° C. and agitating them whereby said solvent-extractable salts are extracted into a solvent extract phase, a fraction of the water present is frozen to a solid phase and said solvent-nonextractable salts remain in solution in an aqueous liquid phase, and separating said solvent phase.

2. The process of claim 1 wherein the solvent-extractable salts are salts of the actinide elements in at least their tetravalent state and the solvent-nonextractable salts are rare earth metal salts.

3. The process of claim 2 wherein the solvent-extractable salts are selected from the group consisting of uranyl salts, plutonyl salts, and mixtures thereof and the rare earth salts are fission product salts.

4. The process of claim 1 wherein the solvent extractable salt is a uranyl salt and the solvent-nonextractable salt is a Pu(III) salt.

5. The process of claim 1 wherein the solvent is hexone.

6. The process of claim 1 wherein the liquids are cooled to from −1° to −2° C.

7. The process of claim 1 wherein the salts to be separated are contained in an aqueous mineral acid solution.

8. The process of claim 7 wherein the mineral acid is nitric acid.

9. A process for separating fission product values from uranium values contained in an aqueous solution, comprising contacting said aqueous solution with a substantially water-immiscible organic solvent while agitating and maintaining the temperature at from −1° to −2° C. until the major part of the water present is frozen; and separating a solvent phase containing uranium values from said ice and an aqueous liquid phase containing fission product values.

10. The process of claim 9 wherein the organic solvent is hexone.

11. A process for separating fission product values from uranium and plutonium values contained in an aqueous feed solution, comprising adding an oxidizing agent to said solution to secure uranium and plutonium in their hexavalent state; contacting said feed solution with a substantially water-immiscible organic solvent while agitating and maintaining the temperature at from −1° to −2° C. until the major part of the water present is frozen; separating a solvent phase containing plutonium and uranium values from said other phases; scrubbing said solvent phase with a small amount of water; and adding the aqueous scrub solution obtained thereby to the feed solution for the purpose of recycling said scrub solution.

12. A process for separating fission product values from uranium and plutonium values contained in an aqueous solution, comprising adding an oxidizing agent to said solution to secure uranium and plutonium in their hexavalent state; contacting said aqueous solution with a substantially water-immiscible organic solvent while agitating and maintaining the temperature at from −1° to −2° C. until the major part of the water present is frozen; separating a solid ice phase, an aqueous liquid phase containing fission product values and a solvent phase containing plutonium and uranium values from each other; concentrating said aqueous liquid phase to remove the major part of water therefrom; adding said concentrated aqueous phase to a molten mass thereby evaporating said fission product salts to dryness; agitating said molten mass thereby uniformly distributing said fission product salts therein; and filling the mixture thus obtained into a container for disposal.

13. A process for separating fission product values from uranium and plutonium values contained in an aqueous solution, comprising adding an oxidizing agent to said solution to secure uranium and plutonium in their hexavalent state; contacting said aqueous solution with a substantially water-immiscible organic solvent while agitating and maintaining the temperature at from −1° to −2° C. until the major part of the water present is frozen; separating a solvent phase containing plutonium and uranium values from said other phases; concentrating said aqueous liquid phase to remove the major part of water therefrom; adding said concentrated aqueous phase to a molten mass thereby evaporating said fission product salts to dryness; condensing the distilled vapors of said concentrating steps and adding them, for recycling, to the aqueous phase to be concentrated; agitating said molten mass thereby uniformly distributing said fission product salts therein; and filling the mixture thus obtained into a container for disposal.

14. The process of claim 12 wherein the molten mass is a metal.

15. A process for separating fission product values from uranium and plutonium values contained in an aqueous solution in their solvent-extractable oxidation state, comprising contacting said aqueous solution with a substantially water-immiscible organic solvent while agitating and maintaining the temperature at from −1° to −2° C. until the major part of the water present is frozen; continuously separating a solid ice phase as it is formed; and then separating a remaining aqueous liquid phase containing fission product values and a solvent phase containing plutonium and uranium values from each other.

16. A process for separating fission product values from uranium and plutonium values contained in an aqueous solution, comprising adding an oxidizing agent to said solution to secure uranium and plutonium in their hexavalent state; contacting said aqueous solution with a substantially water-immiscible organic solvent while agitating and maintaining the temperature at from −1° to −2° C. until the major part of the water present is frozen; continuously separating a solid ice phase as it is formed; separating a remaining aqueous liquid phase containing fission product values and a solvent phase containing plutonium and uranium values from each other; and melting at least the last obtained part of said ice phase and adding it to said separated aqueous liquid phase.

17. A process for separating fission product values from uranium and plutonium values contained in an aqueous solution, comprising adding an oxidizing agent to said solution to secure uranium and plutonium in their hexavalent state; contacting said aqueous solution with a substantially water-immiscible organic solvent while agitating and maintaining the temperature at from −1° to −2° C. until the major part of the water present is frozen; continuously separating a solid ice phase as it is formed; separating a remaining aqueous liquid phase containing fission product values and a solvent phase containing plutonium and uranium values from each other; melting at least the last obtained part of said ice phase and adding it to said separated liquid phase; and treating the resulting liquid with a new supply of solvent whereby it is practically depleted of uranium, and plutonium.

18. A process for separating fission product values from uranium and plutonium values contained in an aqueous feed solution, comprising adding an oxidizing agent to said solution to secure uranium and plutonium in their hexavalent state; contacting said aqueous solution with a substantially water-immiscible organic solvent while agitating and maintaining the temperature at from −1° to −2° C. until the major part of the water present is frozen; separating a solid ice phase, an aqueous liquid phase containing fission product values and a solvent phase containing plutonium and uranium values from each other; scrubbing said solvent phase with water; adding the aqueous scrub solution obtained thereby to the feed solution for the purpose of recycling said scrub solution; contacting said scrubbed solvent phase with an aqueous solution of ferrous sulfamate while cooling the liquids slightly below 0° C. and agitating whereby the plutonium values are reduced to the trivalent state and taken up by an aqueous phase, a fraction of the water present is frozen to a solid phase and the uranium values are retained in a solvent phase; and separating said solvent phase from said other phases.

19. A process for converting solutions of radioactive materials into a non-bulky, easily disposable form, comprising concentrating said solutions to remove the major part of the water present, adding the concentrate thus obtained to a molten mass thereby evaporating said concentrate to dryness, agitating said mixture thereby uniformly distributing said salt obtained in said molten mass, and immersing an evacuated container into said molten mixture thereby filling said container with the radioactive material.

20. The process of claim 19 wherein the molten mass is a metal.

* * * * *